United States Patent
Madsen (10) Patent No.: US 10,145,357 B2
(45) Date of Patent: Dec. 4, 2018

(54) METHOD FOR RETROFITTING VORTEX GENERATORS ON A WIND TURBINE BLADE

(71) Applicant: LM WP PATENT HOLDING A/S, Kolding (DK)

(72) Inventor: Jesper Madsen, Gesten (DK)

(73) Assignee: LM WP PATENT HOLDING A/S, Kolding (DK)

( * ) Notice: Subject to any disclaimer, the term of this patent is extended or adjusted under 35 U.S.C. 154(b) by 0 days.

(21) Appl. No.: 15/691,137

(22) Filed: Aug. 30, 2017

(65) Prior Publication Data

US 2017/0363061 A1    Dec. 21, 2017

Related U.S. Application Data

(63) Continuation of application No. 14/131,848, filed as application No. PCT/EP2012/064298 on Jul. 20, 2012, now Pat. No. 9,777,703.

(30) Foreign Application Priority Data

Jul. 22, 2011   (EP) .................................. 11175051

(51) Int. Cl.
   *B23P 23/00*   (2006.01)
   *B23P 6/00*    (2006.01)
   (Continued)

(52) U.S. Cl.
   CPC ......... *F03D 1/0658* (2013.01); *F03D 1/0608* (2013.01); *F03D 1/0633* (2013.01);
   (Continued)

(58) Field of Classification Search
   CPC ........ F03D 1/0658; F03D 17/00; F03D 1/003; F03D 1/0633; F03D 7/0244;
   (Continued)

(56) References Cited

U.S. PATENT DOCUMENTS

| 4,516,747 A | 5/1985 | Lurz |
| 5,961,080 A | 10/1999 | Sinha |

(Continued)

FOREIGN PATENT DOCUMENTS

| EP | 2141358 A1 | 1/2010 |
| WO | 00159961 A1 | 3/2000 |

(Continued)

OTHER PUBLICATIONS

Janiszewska, J.M.,"Three Dimensional Aerodynamics of a Simple Wing in Oscillation Including Effects of Vortex Generators Dissertation", (online), The Ohio State University, 2004.

(Continued)

*Primary Examiner* — Sarang Afzali
*Assistant Examiner* — Darrell C Ford
(74) *Attorney, Agent, or Firm* — Nath, Goldberg & Meyer; Jerald L. Meyer; Tanya E. Harkins (57) ABSTRACT

A method of retrofitting vortex generators on a wind turbine blade is disclosed, the wind turbine blade being mounted on a wind turbine hub and extending in a longitudinal direction and having a tip end and a root end, the wind turbine blade further comprising a profiled contour including a pressure side and a suction side, as well as a leading edge and a trailing edge with a chord having a chord length extending there between, the profiled contour, when being impacted by an incident airflow, generating a lift. The method comprises identifying a separation line on the suction side of the wind turbine blade, and mounting one or more vortex panels including a first vortex panel comprising at least one vortex generator on the suction side of the wind turbine blade between the separation line and the leading edge of the wind turbine blade.

17 Claims, 5 Drawing Sheets

(51) Int. Cl.
B21D 53/78 (2006.01)
B21K 3/04 (2006.01)
B23P 15/02 (2006.01)
F03D 1/06 (2006.01)
F03D 7/02 (2006.01)
F03D 7/04 (2006.01)
F03D 17/00 (2016.01)
F03D 80/50 (2016.01)

(52) U.S. Cl.
CPC .......... F03D 7/0244 (2013.01); F03D 7/0256 (2013.01); F03D 7/04 (2013.01); F03D 17/00 (2016.05); F03D 80/50 (2016.05); *F05B 2240/122* (2013.01); *Y02E 10/721* (2013.01); *Y02E 10/723* (2013.01); *Y10T 29/49318* (2015.01)

(58) Field of Classification Search
CPC ........ F03D 7/0256; F03D 7/04; F03D 1/0608; F03D 1/0675; F01D 5/12; F01D 5/145; F01D 5/02; F01D 5/04; F01D 25/285; F01D 5/005; F01D 5/18; Y02E 10/723; Y02E 10/721; Y10T 29/49318; Y10T 29/49716; Y10T 29/49718; Y10T 29/49732; Y10T 29/49742; Y10T 29/49316; Y10T 29/49336; Y10T 29/49337; Y10T 29/49339; Y10T 29/79341; Y10T 29/49343; B23P 15/04; B23P 2700/01; B23P 9/00; B23P 2700/06; B23P 6/002; B23P 6/005; B23P 6/007; B23P 19/04; B23P 15/02; B23P 15/006; F05B 2230/60; F05B 2230/80; F05B 2230/70; F05B 2240/30; B22F 2007/068; B22F 5/04; B23C 2220/366; B23C 2200/366; B23C 2215/00; B23C 3/18; B23K 10/027; B23K 2201/001; B23K 9/044; F05D 2230/10; F05D 2240/81; F05D 2260/20; F05D 2230/60; B21H 7/16; B21K 1/12; B21K 3/04; B22C 1/00; F03B 3/12; F04D 29/324; B29C 65/08; B29C 66/90; B29C 66/92; B62D 65/18
USPC .......... 29/401.1, 402.1, 402.09, 402.16, 889, 29/889.1, 889.7, 889.71, 889.72, 889.721, 29/889.722, 407.01, 407.05
See application file for complete search history.

(56) References Cited

U.S. PATENT DOCUMENTS

| | | | |
|---|---|---|---|
| 7,059,833 B2 | 6/2006 | Stiesdal et al. | |
| 7,708,530 B2 | 5/2010 | Wobben | |
| 7,909,576 B1 | 3/2011 | Van Der Bos et al. | |
| 9,556,849 B2 | 1/2017 | Riddell et al. | |
| 2006/0140760 A1 | 6/2006 | Saddoughi et al. | |
| 2007/0018056 A1 | 1/2007 | Narramore | |
| 2008/0121301 A1 | 5/2008 | Norris | |
| 2008/0175711 A1 | 7/2008 | Godsk et al. | |
| 2010/0008787 A1 | 1/2010 | Godsk | |
| 2010/0158688 A1 | 6/2010 | Benito et al. | |
| 2010/0194144 A1 | 8/2010 | Sinha | |
| 2010/0209258 A1* | 8/2010 | Fuglsang | F03D 1/0641 416/90 R |
| 2010/0260614 A1* | 10/2010 | Fuglsang | F03D 1/0675 416/241 R |
| 2010/0263448 A1 | 10/2010 | Hughes et al. | |
| 2011/0110777 A1 | 5/2011 | Abdallah et al. | |
| 2011/0142628 A1 | 6/2011 | Xiong | |
| 2011/0142673 A1 | 6/2011 | Fang et al. | |
| 2011/0182746 A1 | 7/2011 | Fiala et al. | |
| 2011/0223022 A1 | 9/2011 | Wang et al. | |
| 2011/0229321 A1 | 9/2011 | Kilaras et al. | |
| 2011/0315248 A1* | 12/2011 | Simpson | F15D 1/003 137/561 R |
| 2012/0057984 A1 | 3/2012 | Fuglsang et al. | |
| 2012/0067515 A1 | 3/2012 | Dahl et al. | |
| 2012/0100005 A1 | 4/2012 | Ostergaard Kristensen et al. | |
| 2012/0134812 A1 | 5/2012 | Nanukuttan et al. | |
| 2012/0151769 A1 | 6/2012 | Brake et al. | |
| 2012/0257979 A1 | 10/2012 | Jensen et al. | |
| 2013/0009016 A1* | 1/2013 | Fox | B64C 9/24 244/204.1 |
| 2013/0078095 A1 | 3/2013 | Olesen | |
| 2013/0129520 A1 | 5/2013 | Enevoldsen et al. | |
| 2013/0259702 A1 | 10/2013 | Eisenberg et al. | |
| 2013/0280073 A1* | 10/2013 | Erichsen | F03D 1/0675 416/146 R |
| 2013/0280085 A1* | 10/2013 | Koegler | F03D 1/0633 416/228 |
| 2013/0285489 A1* | 10/2013 | Lemma | H02K 1/187 310/65 |
| 2014/0069182 A1 | 3/2014 | Schmidt et al. | |
| 2014/0140856 A1* | 5/2014 | Madsen | F03D 1/0641 416/236 R |
| 2014/0219810 A1 | 8/2014 | Wurth et al. | |
| 2014/0241880 A1* | 8/2014 | Madsen | F03D 7/0244 416/1 |
| 2014/0328693 A1 | 11/2014 | Wilson et al. | |
| 2014/0334938 A1 | 11/2014 | Riddell et al. | |
| 2015/0010407 A1 | 1/2015 | Zamora Rodriguez et al. | |
| 2015/0308103 A1 | 10/2015 | Dyson et al. | |
| 2015/0361951 A1* | 12/2015 | Zamora Rodriguez | F03D 1/0633 416/236 R |
| 2016/0222941 A1* | 8/2016 | Tobin | F03D 1/0633 |
| 2016/0327021 A1 | 11/2016 | Tobin et al. | |

FOREIGN PATENT DOCUMENTS

| | | |
|---|---|---|
| WO | 0116482 A1 | 3/2001 |
| WO | 0208600 A1 | 1/2002 |
| WO | 2006122547 A1 | 11/2006 |
| WO | 2008113349 A2 | 9/2008 |
| WO | 2010100237 A2 | 9/2010 |

OTHER PUBLICATIONS

Godard, G., et al., "Control of a decelerating boundary layer, Part 1: Optimization of passive vortex generatiors", Aerospace Science and Technology, vol. 10, pp. 181-191, (2006), XP28033030A.

Kim D. H., et al.,"Predicting Unsteady Blade Loads of a Wind Turbine Using RANS and Vorticity Transport Methodologies", European Wind Energy Conference, Apr. 20, 2010-Apr. 23, 2010, Warsaw, Poland, XP009152918.

Savino, J.M., et al., "Wind Turbine Flow Visualization Studies", Proceedings: Windpower '85, Aug. 27-30, 1985, San Francisco, CA, pp. 559-564, XP009152928.

"Vortex Generators"(online), http://www.bcchapel.org/pp./0003/Vortex%20Generator.html, published before Apr. 2011.

* cited by examiner

METHOD FOR RETROFITTING VORTEX GENERATORS ON A WIND TURBINE BLADE

This is a continuation of U.S. patent application Ser. No. 14/131,848 (filed Mar. 25, 2014 and issued as U.S. Pat. No. 9,777,703), which was a National Phase Application filed under 35 U.S.C. 371 as a national stage of PCT/EP2012/064298, filed Jul. 20, 2012, claiming priority from European Application No. 11175051.9, filed Jul. 22, 2011, the content of each of which is hereby incorporated by reference in its entirety.

The present invention relates to a method for retrofitting vortex generators on a wind turbine blade.

BACKGROUND ART

Wind turbine manufacturers are constantly making efforts to improve the efficiency of their wind turbines in order to maximise the annual energy production. Further, the wind turbine manufacturers are interested in prolonging the lifetime of their wind turbine models, since it takes a long time and a lot of resources to develop a new wind turbine model. An obvious way to improve the efficiency of the wind turbine, is to improve the efficiency of the wind turbine blades, so that the wind turbine can generate a higher power output at a given wind speed. However, one cannot arbitrarily replace the blades of a wind turbine model with other, more efficient blades.

Accordingly, there is a need for ways to improve the efficiency of existing blades.

SUMMARY

Accordingly, it is an object of the present invention to provide a wind turbine blade with improved aerodynamic properties.

A method of retrofitting vortex generators on a wind turbine blade is provided, the wind turbine blade being mounted on a wind turbine hub and extending in a longitudinal direction and having a tip end and a root end, the wind turbine blade further comprising a profiled contour including a pressure side and a suction side, as well as a leading edge and a trailing edge with a chord having a chord length extending there between, the profiled contour, when being impacted by an incident airflow, generating a lift. The method comprises the steps of determining the distribution of deposit on at least a section of the suction side of the wind turbine blade and identifying a separation line based on the distribution of deposit, and mounting one or more vortex panels including a first vortex panel comprising at least one vortex generator on the suction side of the wind turbine blade between the separation line and the leading edge of the wind turbine blade.

Thus, it is recognized that the invention relates to a method of determining a separation area on the suction side of the blade by observing the wind turbine after a pre-determined amount of time and observing deposits on the blades. The pre-determined amount of time may for instance be one day. However, it may also be a week, weeks, months or even years. Thus, it is recognized that the method may also be utilized on wind turbines having been in operation for a long period of time.

The separation line corresponds to a line that extends in the longitudinal direction, and which identifies the first chordal position, as seen from the leading edge of the blade, where a separation of airflow may occur.

The deposits may be smoke particles, dirt, aerosols or the like that can readily be identified on the surface of the blade, e.g. by discolouration. It may also be special particles that have been seeded into the wind upwind of the wind turbine. Thus, it is seen that the invention provides a method of identifying the areas of separation of the airflow by identifying the deposits on the blade. This is readily achievable, since turbulent or separated flows are likely to deposit particles on the surface of the blade, whereas an attached or laminar flow propagates substantially parallel to the surface of the blade does not. Accordingly, it is also clear that the vortex generators are arranged in an area outside, but close to, the identified area having deposited particles.

The method according to the present invention enables provision of a wind turbine blade with improved aerodynamic properties thereby enabling a higher energy yield from the wind turbine with the respective wind turbine blade.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

The figures are schematic and simplified for clarity, and they merely show details which are essential to the understanding of the invention, while other details have been left out. Throughout, the same reference numerals are used for identical or corresponding parts.

The method comprises identifying a separation line on the suction side of the wind turbine blade. Identifying a separation line or one or more separation points on the suction side of the wind turbine blade may comprise determining at least one parameter indicative of flow properties in one or more measurement points or zones. For example, a cross section perpendicular to the longitudinal direction may comprise a plurality of measurement points or observation points $S_{n,k}$, where n is an index denoting the cross section number and k is an index denoting the number of measurement point or zones in the n'th cross section. Identifying a separation line may be based on the values of the at least one parameter indicative of flow properties in one or more measurement points or zones. The measurement points $S_{n,k}$ are arranged at distances $d_{meas\_root,n}$ from the root end with a chord-wise distance $d_{meas,n,k}$ from the leading edge. For example, the number n of measurement cross sections may be at least two, such as at least three, four, five, six or more. For example, the number k of measurement points in a cross section may be at least two, such as at least three, four, five, six or more. The number k and/or distance $d_{meas\_root,n}$ of measurement points in a cross section may vary for each cross section.

A separation line may be identified using identification means, for example including chemical means, e.g. in the form of chemical tests to measure amounts of deposit in one or more measurement points or zones. Alternatively or in combination, identification means may comprise optical means, such as a camera, laser assembly with laser source and detector, e.g. to identify or measure amounts of deposit by color analysis and/or by analyzing one or more properties of light emitted or reflected from the suction side surface of the wind turbine.

In the method, mounting one or more vortex panels may comprise mounting one or more vortex panels and/or vortex generators at a distance $d_{sep}$ from the separation line.

The distance $d_{sep}$ may be in the range from 0.1 m to 1.5 m, e.g. in the range from 0.2 m to 1 m, such as about 0.5 m. A vortex panel comprises one or more vortex generators. Typically, a vortex generator comprises one or a pair of vanes protruding from a base. A plurality of vortex generators may have a common base thereby forming a vortex panel. The distance $d_{sep}$ is measured perpendicular to the longitudinal direction along the suction side surface of the wind turbine blade.

The method advantageously relates to a wind turbine provided with wind turbine blades having a length of at least 40 meters, more advantageously to blades having a length of at least 50 meters.

In the method, mounting one or more vortex panels may comprise mounting one or more vortex panels at a distance $d_{panel}$ from the leading edge in the range from 0.1 m to 5 m depending on the position of the separation line. The distance $d_{panel}$ is the chord-wise distance of the vortex panel from the leading edge perpendicular to the longitudinal direction. The distance $d_{panel}$ may vary in the longitudinal direction of the wind turbine blade, i.e. $d_{panel}$ may be a function of the distance from the root.

The distance from the identified separation line cannot be too small, since the position of the separation line changes during different operating conditions. On the other hand, the distance from the separation line cannot be too large, since the effect of the vortex generators is reduced when the distance increases. It is important that the vortex generators are positioned between the separation line and the leading edge in order to obtain the optimum effect. Further, it is desired to arrange the vortex generators as far from the leading edge or as close to the trailing edge as possible in order to reduce or eliminate drag effects.

Identifying a separation line or one or more separation points may comprise determining the distribution of deposit on at least a section of the suction side of the wind turbine blade and identifying a separation line or one or more separation points based on the distribution of deposit. For example, the separation line may be identified as a line along which the amount of deposit is equal to a first threshold value. A separation point of a separation line, may be identified as a point between a first measurement point or zone and a second measurement point, where the amount of deposit in the first measurement point is above a first threshold value and where the amount of deposit in the second measurement point is below the first threshold value.

The distribution of deposit may be measured by determining at least one parameter indicative of the amount of deposit and/or separation line indicator in a plurality of measurement points or zones on the suction side of the wind turbine.

A first parameter indicative of the amount of deposit may be the thickness of deposit in the measurement points or zones. A second parameter indicative of the amount of deposit may be the color and/or color concentration of the measurement points or zones. Other parameters may include weight, intensity of light emitted or reflected from the measurement point, etc.

Identifying a separation line on the suction side of the wind turbine blade may be performed when the wind turbine has been operated for a period of time, e.g. at least one day, or until the wind turbine has been operating under a variety of operating conditions. Thereby, the position of the vortex generators on the wind turbine blades is adapted to the specific wind conditions at the wind turbine site, thereby increasing the wind turbine performance.

The method may comprise applying a separation line indicator to the suction side of the wind turbine and operating the wind turbine for at period of time. Subsequently after operating the wind turbine for the period of time, identifying a separation line on the suction side of the wind turbine blade may be based on the separation line indicator or properties thereof.

The separation line indicator may be a coating, paint or the like facilitating deposit of material on the wind turbine blade, the distribution of deposit being indicative of the separation line.

The separation line indicator may be a coating, paint or the like facilitating removal of separation line indicator on the wind turbine blade during operation, the distribution of separation line indicator being indicative of the separation line. The separation line indicator may facilitate both deposit of material and removal of separation line indicator during operation.

The separation line indicator may comprise powder, such as graphite powder. The powder may be suspended in a liquid such as an organic solvent or mixtures thereof.

Identifying a separation line may comprise determining the direction of wind flow in a plurality of measurement points or zones on the suction side of the wind turbine during operation and identifying a separation line based on the wind flow directions. For this purpose, the separation line indicator may comprise one or more tufts distributed along the suction side surface.

Identifying a separation line on the suction side of the wind turbine blade may comprise identifying a separation line in a transition region or at least a part thereof of the wind turbine blade. Further, or as an alternative, identifying a separation line on the suction side of the wind turbine blade may comprise identifying a separation line in a root region or at least a part thereof of the wind turbine blade.

Identifying a separation line on the suction side of the wind turbine blade may comprise identifying a separation line at a distance from the root end, e.g. in the range from 3 m to about 18 m. A separation line may be identified at a distance from the root in the range from 0.1 L to 0.4 L, where L is the length of the wind turbine blade.

The method may comprise seeding the suction side flow with particles, e.g. colored particles (red, blue, black, green, grey or other colors), for deposit of the particles on the suction side surface. Identifying a separation line on the suction side of the wind turbine blade may be based on the distribution of particle deposit on the suction side of the wind turbine blade.

Figure 1:
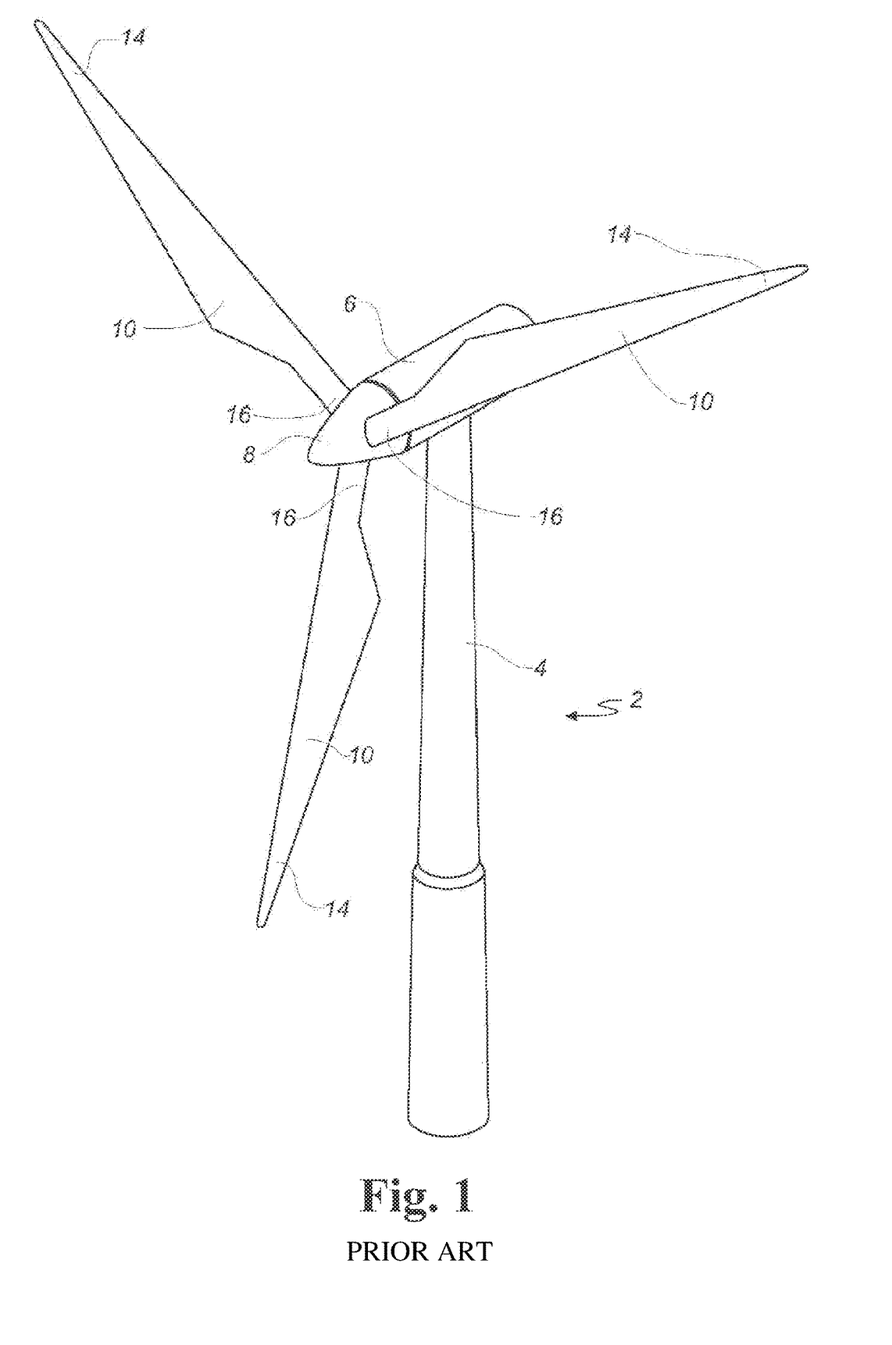
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
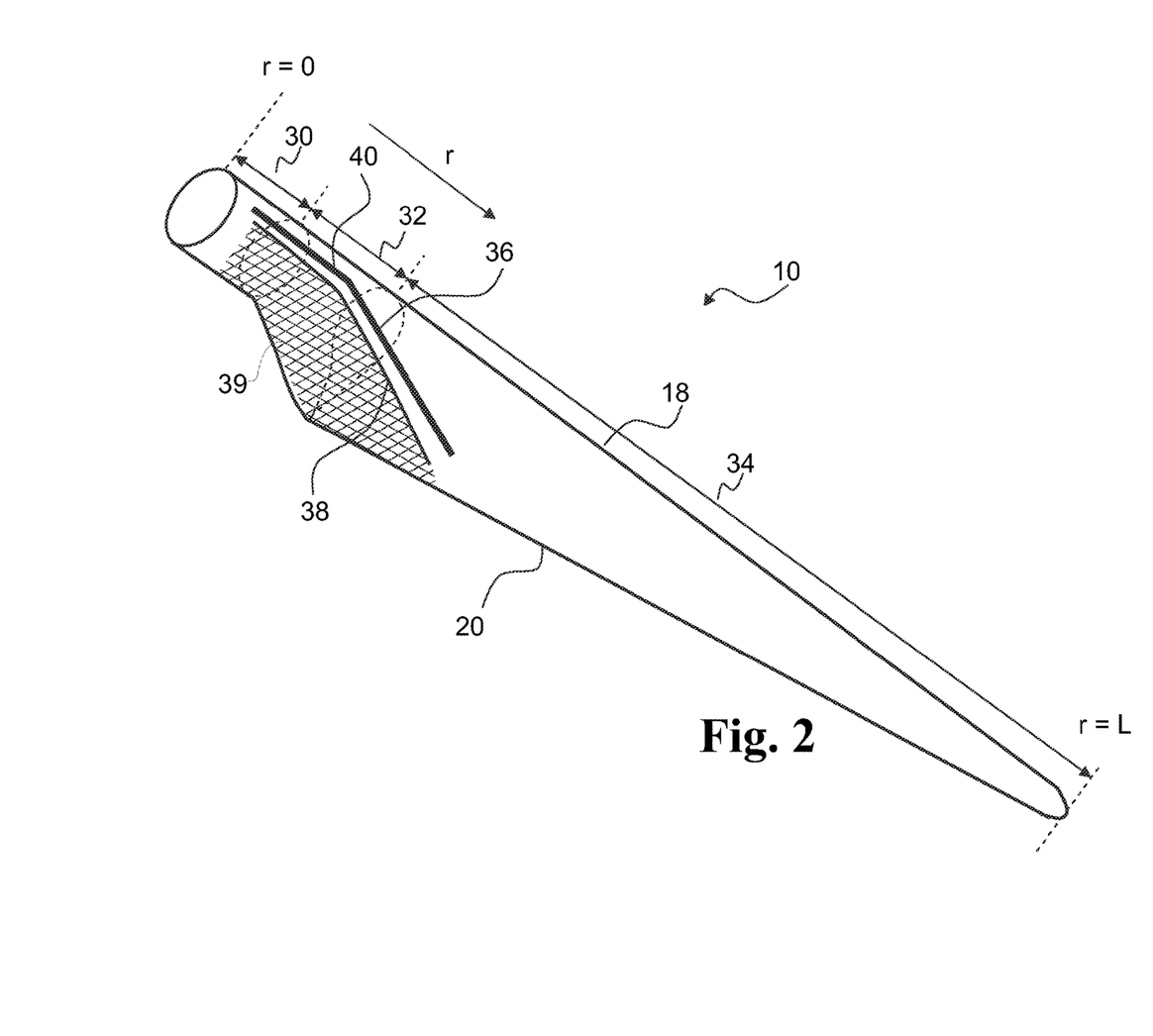
FIG. 2 shows a schematic view of a wind turbine blade retrofitted with the method according to the invention.

FIG. 2 shows a schematic view of a wind turbine blade 10 after retrofitting according to the method. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 39 of the blade 10 is defined as the position, where the blade 10 has its largest chord length. The shoulder 39 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

One or more vortex panels 36 each comprising one or more vortex generators are mounted or retrofitted on the suction side of the wind turbine blade 10 between the identified separation line 38 and the leading edge 18 of the wind turbine blade. The separation line 38 may be identified by determining the distribution of a deposit 37 on at least a section of the suction side of the wind turbine blade. Particles, such as smoke particles, dirt, aerosols or the like, will deposit on the blade over time due to the turbulent or separated flow, thus making a separation area on the blade detectable, e.g. by a discolouration of the surface of the blade.

Figure 3:
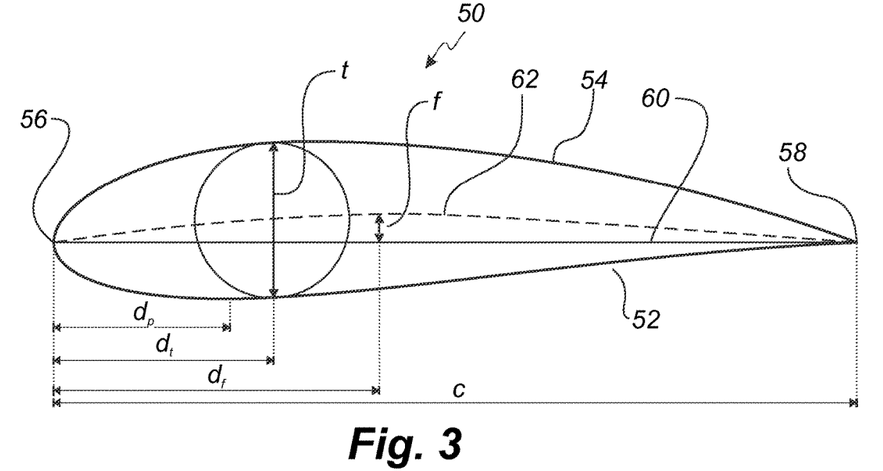
FIG. 3 shows a schematic view of an airfoil profile.
Figure 4:
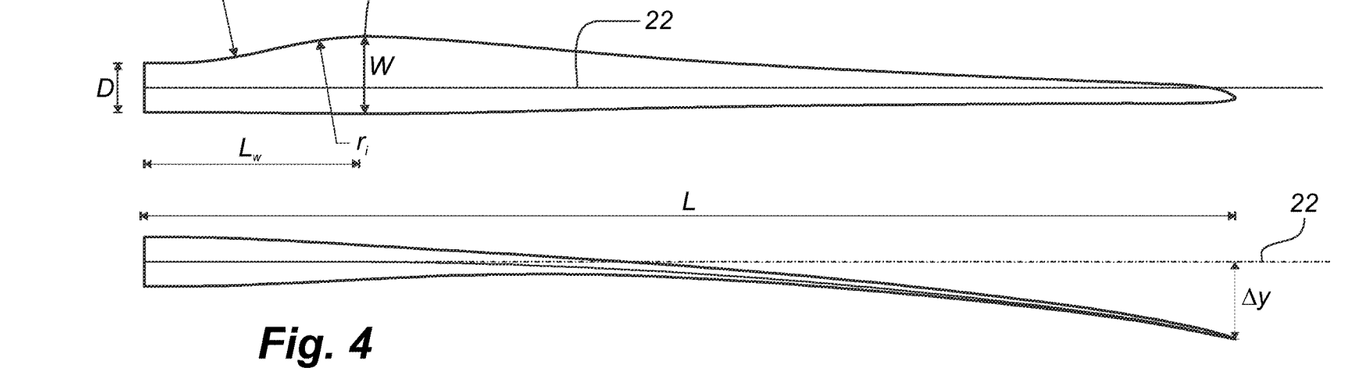
FIG. 4 shows a schematic view of a wind turbine blade seen from above and from the side.

FIGS. 3 and 4 depict parameters, which is used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 39 of the blade is located at a position $r=L_w$, and has a shoulder width W, which equals the chord length at the shoulder 39. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as Δy, which corresponds to the out of plane deflection from a pitch axis 22 parallel to the longitudinal direction of the blade.

Figure 5:
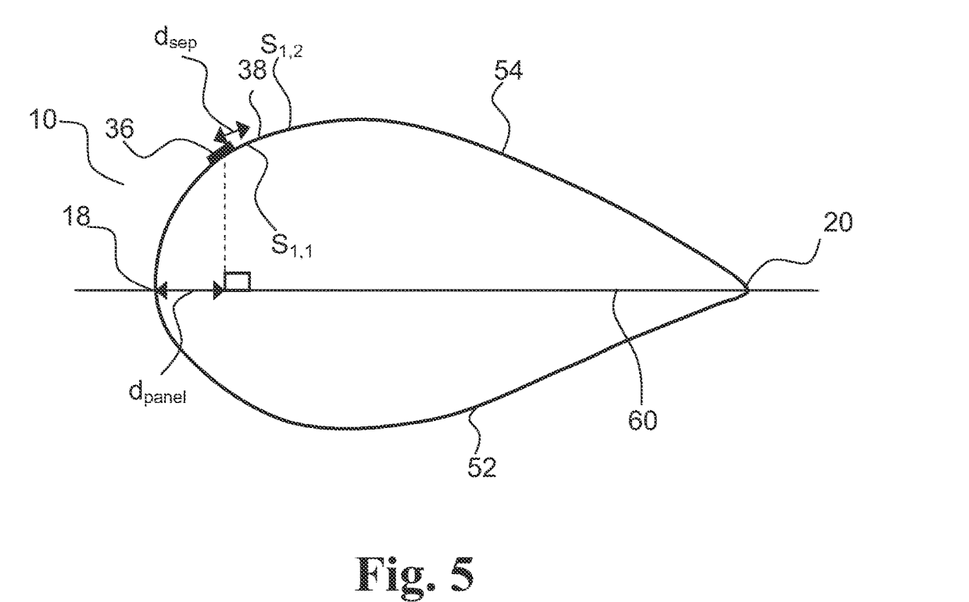
FIG. 5 illustrates an exemplary cross section of a wind turbine blade retrofitted with the method according to the invention, FIG. 6 schematically illustrates vortex generators mounted on the suction side of a wind turbine blade.

FIG. 5 shows an exemplary cross section of a wind turbine blade perpendicular to the longitudinal direction after retrofitting a vortex panel 36 on the suction side 54 of the wind turbine blade. The vortex panel 36 has been mounted between the identified separation line 38 and the leading edge 56 of the wind turbine blade at a distance $d_{sep}$ of about 0.5 m perpendicular to the longitudinal direction along the suction side surface. The separation line or point position for the illustrated cross section has been identified by measuring a parameter indicative of flow properties, e.g. amount of deposit, in measurement points $S_{1,1}$ and $S_{1,2}$. The distance $d_{panel}$ between the leading edge 18 and the vortex panel 36 is about 1 m. In general, the distance $d_{panel}$ between the leading edge 18 and the vortex panel 36 varies along in the longitudinal direction. The distance $d_{panel}$ typically increases towards the tip end. For example, $d_{panel,1}$ for a first vortex generator positioned at a first distance $d_1$ from the root end may be less than $d_{panel,2}$ for a second vortex generator positioned at a second distance $d_2$ from the root end, where $d_2 > d_1$.

Figure 6:
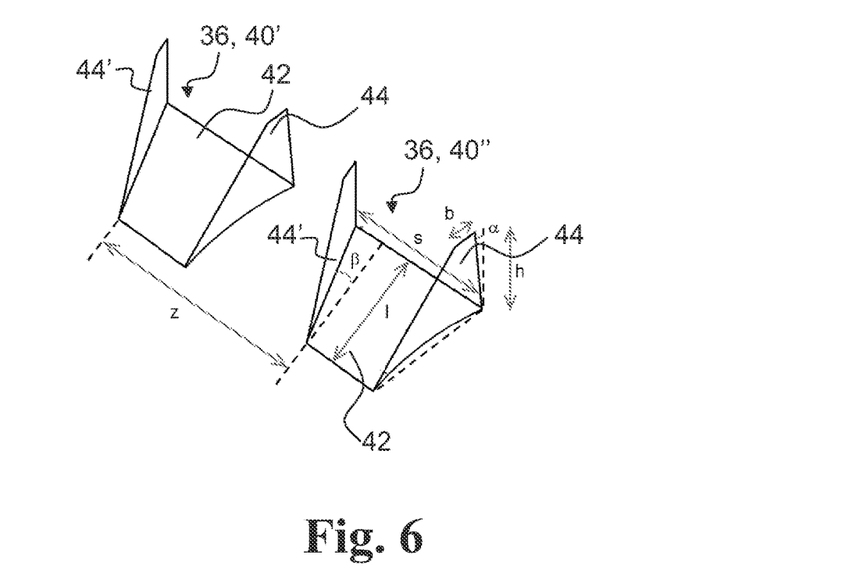

FIG. 6 shows exemplary first and second vortex generators 40', 40" mounted on the suction side surface of a wind turbine blade. Parameter values of exemplary vortex generators VG1, VG2 and VG3 and their configuration on the suction side of the wind turbine blade are shown in Table 1.

TABLE 1

Vortex generator parameters

| Parameter | Ref | Unit | VG1 | VG2 | VG3 |
|---|---|---|---|---|---|
| Height | h | [mm] | 10 (5-15) | 20 (15-25) | 30 (25-35) |
| Length (width) | l | [mm] | 20 (10-30) | 40 (30-50) | 60 (50-70) |
| Length (vane top) | b | [mm] | 2.4 (1-4) | 4.8 (3-6) | 7.5 (6-9) |
| Spacing | s | [mm] | 30 (20-40) | 60 (40-80) | 90 (70-110) |
|  | z | [mm] | 50 (30-70) | 100 (75-125) | 150 (100-200) |
| Angle | α | [deg] |  | 6 (3-9) |  |
|  | β | [deg] |  | 18 (10-25) |  |
|  | a | [deg] |  | 0.9 (0.5-1.5) |  |

In Table 1, spacing parameter values z are indicated for neighboring vortex generators of the same type (VG1, VG2, VG3). When shifting from VG1 to VG2 in a panel or between neighbouring vortex generators, the distance z between VG1 and VG2 may be in the range from 50 mm to 100 m, e.g. 75 mm. When shifting from VG2 to VG3 in a panel or between neighbouring vortex generators, the distance z between VG2 and VG3 may be in the range from 100 mm to 150 m, e.g. 125 mm. Neighboring vortex generators may be rotated in relation to each other in order to facilitate optimum wind flow across the vortex generator. The base 42 may be planar, single curved or doublecurved in order to facilitate mounting on the suction side of the wind turbine blade.

Figure 7:
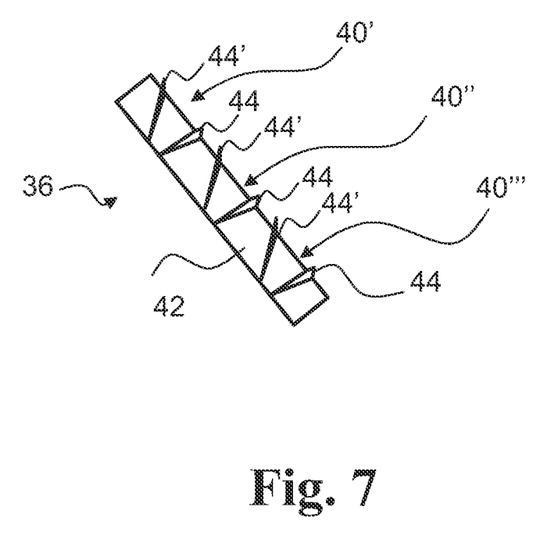
FIG. 7 is a perspective view of a part of a vortex panel.

FIG. 7 is a perspective view of a part of a vortex panel comprising a plurality of vortex generators 40', 40", 40''' with vanes 44, 44' mounted on a base 42. A compensation angle may be added or subtracted from the angle β of the different vanes in Table 1 in order to adapt the vortex panel for installation at different angles with respect to the longitudinal direction.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art.

LIST OF REFERENCES 2 wind turbine
4 tower
6 nacelle
8 hub
10 blade
14 blade tip
16 blade root
18 leading edge
20 trailing edge
22 pitch axis
30 root region
32 transition region
34 airfoil region
36 vortex panel
37 area of deposits on blade surface
38 separation line
39 shoulder
40 vortex generator
40' first vortex generator
40" second vortex generator
40''' third vortex generator
42 base
44 first vane
44' second vane
50 airfoil profile
52 pressure side
54 suction side
56 leading edge
58 trailing edge
60 chord
62 camber line/median line
c chord length
$d_{sep}$ distance of vortex panel to separation line or point along suction side surface perpendicular to longitudinal direction
$d_{panel}$ chord-wise distance of vortex panel to leading edge perpendicular to longitudinal direction
$d_t$ position of maximum thickness
$d_f$ position of maximum camber
$d_p$ position of maximum pressure side camber
$d_s$ shoulder distance
f camber
L blade length
P power output
r local radius, radial distance from blade root
t thickness
$v_w$ wind speed
θ twist, pitch
Δy prebend

The invention claimed is:

1. A method of retrofitting vortex generators on a wind turbine blade, the wind turbine blade being mounted on a wind turbine hub and extending in a longitudinal direction and having a tip end and a root end, the wind turbine blade further comprising a profiled contour including a pressure side and a suction side, as well as a leading edge and a trailing edge with a chord having a chord length extending there between, the profiled contour, when being impacted by an incident airflow, generating a lift, the method comprising the steps of:
depositing particles on a surface of the suction side of the wind turbine blade creating a particle deposit on the surface of the suction side of the wind turbine blade;
determining a distribution of the particle deposit on at least a section of the suction side of the wind turbine blade;
identifying a separation line based on the distribution of the particle deposit on the suction side of the wind turbine blade; and
mounting one or more vortex panels, including a first vortex panel comprising at least one vortex generator, on the suction side of the wind turbine blade between the separation line and the leading edge of the wind turbine blade,
wherein the distribution of the particle deposit is measured by determining at least one parameter indicative of an amount of deposit in a plurality of measurement points or zones on a suction side of a wind turbine.

2. The method according to claim 1, wherein a first parameter indicative of the amount of deposit is the thickness of deposit in the measurement points or zones.

3. The method according to claim 1, wherein a second parameter indicative of the amount of deposit is the color of the measurement points or zones.

4. The method according to claim 1, wherein mounting one or more vortex panels comprises mounting one or more vortex panels at a distance from the separation line in the range from 0.1 meter to 1.5 meters.

5. The method according to claim 4, wherein the distance from the separation line is in the range from 0.2 meter to 1 meter.

6. The method according to claim 5, wherein the distance from the separation line is in the range from 0.25 meter to 0.75 meter.

7. The method according to claim 6, wherein the distance from the separation line is about 0.5 meter.

8. The method according to claim 1, wherein a length of the wind turbine blade is at least 40 meters.

9. The method according to claim 8, wherein the length of the wind turbine blade is at least 50 meters.

10. The method according to claim 1, wherein identifying a separation line on the suction side of the wind turbine blade is performed when the wind turbine has been operated for at least one day.

11. The method according to claim 1, wherein the method comprises the steps of:
   applying a separation line indicator to the suction side of the wind turbine; and
   operating the wind turbine for a period of time,
   wherein identifying a separation line on the suction side of the wind turbine blade is based on the separation line indicator during or after operation of the wind turbine.

12. The method according to claim 11, wherein the separation line indicator is a coating facilitating deposit of material on or removal of the coating during operation.

13. The method according to claim 11, wherein the separation line indicator comprises pressure sensitive paint.

14. The method according to claim 11, wherein the separation line indicator comprises powder.

15. The method according to claim 11, wherein the separation line indicator comprises one or more tufts.

16. The method according to claim 1, wherein identifying a separation line on the suction side of the wind turbine blade comprises identifying a separation line at a distance from the root end in the range from $0.1 \times L$ to $0.4 \times L$, where L is a length of the wind turbine blade.

17. The method according to claim 1, wherein identifying a separation line comprises determining the direction of wind flow in a plurality of measurement points or zones on the suction side of the wind turbine during operation and identifying a separation line based on the wind flow directions.

* * * * *